United States Patent
Guo et al.

(10) Patent No.: US 10,865,299 B2
(45) Date of Patent: Dec. 15, 2020

(54) MULTI-MODAL POLYISOOLEFIN COMPOSITIONS AND PROCESSES THEREFOR

(71) Applicant: ARLANXEO CANADA INC., Sarnia (CA)

(72) Inventors: Sharon Guo, London (CA); Gregory J. E. Davidson, London (CA); Brianna Binder, Essex (CA)

(73) Assignee: ARLANXEO CANADA INC., Sarnia (CA)

( * ) Notice: Subject to any disclaimer, the term of this patent is extended or adjusted under 35 U.S.C. 154(b) by 0 days.

(21) Appl. No.: 16/336,731

(22) PCT Filed: Sep. 28, 2017

(86) PCT No.: PCT/CA2017/051149
§ 371 (c)(1),
(2) Date: Mar. 26, 2019

(87) PCT Pub. No.: WO2018/058245
PCT Pub. Date: Apr. 5, 2018

(65) Prior Publication Data
US 2020/0048447 A1  Feb. 13, 2020

(30) Foreign Application Priority Data

Sep. 29, 2016 (EP) .................... 16191508

(51) Int. Cl.
C08L 23/22 (2006.01)
C08L 23/28 (2006.01)
B60C 1/00 (2006.01)

(52) U.S. Cl.
CPC .......... C08L 23/283 (2013.01); B60C 1/0008 (2013.01); C08L 23/22 (2013.01); C08L 2205/025 (2013.01)

(58) Field of Classification Search
CPC ...... B60C 1/0008; C08L 23/22; C08L 23/283; C08L 2205/025
See application file for complete search history.

(56) References Cited

U.S. PATENT DOCUMENTS

| | | | |
|---|---|---|---|
| 2,356,128 A | 8/1944 | Thomas et al. | |
| 5,194,538 A | 3/1993 | Puskas et al. | |
| 5,417,930 A | 5/1995 | McDonald, Jr. et al. | |
| 6,403,747 B2 | 6/2002 | Gronoski | |
| 6,841,642 B2 | 1/2005 | Kaszas | |
| 2007/0238822 A1* | 10/2007 | Wang et al. | C08L 2666/24 524/445 |
| 2016/0319054 A1* | 11/2016 | Lattner et al. | C08F 210/06 |

FOREIGN PATENT DOCUMENTS

| | | |
|---|---|---|
| CA | 2934580 A1 | 7/2015 |
| CN | 102372822 A | 3/2012 |
| EP | 1277466 A1 | 1/2003 |
| WO | 2007117374 A1 | 10/2007 |
| WO | 2015164962 A1 | 11/2015 |

OTHER PUBLICATIONS

Ullmanns Encyclopedia of Industrial Chemistry, (1993), vol. A 23, pp. 288-295.
International Search Report and Written Opinion, Application No. PCT/CA2017/051149 dated Dec. 21, 2017.
International Preliminary Report on Patentability, Application No. PCT/CA2017/051149 dated Dec. 21, 2017.
"Rubber Technology" (Third Edition) by Maurice Morton, Chapter 10 (Van Nostrand Reinhold Company © 1987), particularly pp. 297-300.
Aubert Y, Coran, Encyclopedia of Polymer Science and Engineering, vol. 17, Transitions and Relaxations to Zwitterionic Polymerization, Vulcanization, 1990, John Wiley & Sons, vol. 17, pp. 666-698.

* cited by examiner

*Primary Examiner* — Nathan M Nutter
(74) *Attorney, Agent, or Firm* — The Dobrusin Law Firm, P.C.

(57) ABSTRACT

A polyisoolefin-based polymer composition having a multimodal molecular weight distribution is described, which can be prepared by the late addition of a chain transfer agent to the polymerization process. The polymer composition has a low molecular weight fraction having a peak molecular weight ($M_p$) of less than about 100,000 g/mol and a high molecular weight fraction having a peak molecular weight ($M_p$) of greater than about 250,000 g/mol, the low molecular weight fraction present in the composition in an amount less than the high molecular weight fraction. Cured articles produced from the polyisoolefin-based polymer composition exhibit improved processability while maintaining physical properties.

20 Claims, 7 Drawing Sheets

MULTI-MODAL POLYISOOLEFIN COMPOSITIONS AND PROCESSES THEREFOR

FIELD OF THE INVENTION

The present invention relates to polyisoolefin compositions, especially butyl rubber compositions, and processes for production thereof.

BACKGROUND OF THE INVENTION

Butyl rubbers are understood to be copolymers of an isoolefin and one or more, preferably conjugated, multiolefins as co-monomers. Specifically, poly(isobutylene-co-isoprene) (IIR) is a high molecular weight copolymer produced via cationic polymerization with isobutylene (IB) and isoprene (IP). Since the 1940's, IIR has been prepared through the random cationic copolymerization of isobutylene with small amounts of isoprene (usually not more than 2.5 mol %). Butyl rubber or butyl polymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295, the contents of which are herein incorporated by reference.

An improvement on the catalyst system for the production of butyl rubber containing <2.5 mol % isoprene was presented by Gronowski (U.S. Pat. No. 6,403,747) wherein a dialkylaluminum is reacted with a minor component of diethylaluminum and small quantities of water or other additives. The improvements presented in Gronowski allow for the production of a more uniform catalyst with improved activity for the production of butyl rubber. Such advancements can be applied to the present invention.

As a result of its molecular structure, IIR possesses superior air impermeability, a high loss modulus, oxidative stability and extended fatigue resistance. This elastomer is mainly used in tire inner liners and inner tubes due to the very low permeability to gases. It is also the material of choice for other application areas due to the superior aging and chemical resistance, or the high damping properties inherent to the polymer structure.

The processability of butyl rubbers during mixing (internal mixer), milling, calendaring, extrusion, and moulding, is of utmost importance to customers. High molecular weight butyl polymers result in improved green strength, but can negatively impact the stress relaxation, which, in turn, has a negative influence on the other processing characteristics of the resulting rubber compounds. There have been several attempts to improve the ease of processing by way of post modifications to butyl rubber; blending with different polymers, blending butyl rubber of different molecular weights, adding oil or resins during compounding, etc. While such attempts have been shown to improve the processability, they either require an added step in the overall synthesis of the product, increase cost or they adversely affect the physical properties of the finished compound.

Improvements to processability of polyisoolefin polymers, especially butyl rubbers, are therefore desirable in the art.

SUMMARY OF THE INVENTION

In accordance with a first aspect of the present invention, there is provided a polyisoolefin-based polymer composition comprising a multimodal molecular weight distribution comprising a low molecular weight fraction having a peak molecular weight ($M_p$) of less than about 100,000 g/mol and a high molecular weight fraction having a peak molecular weight ($M_p$) of greater than about 250,000 g/mol, the low molecular weight fraction present in the composition in an amount less than the high molecular weight fraction.

In accordance with a second aspect of the present invention, there is provided a process for producing a polyisoolefin-based polymer composition having a multimodal molecular weight distribution, the process comprising: polymerizing an isoolefin in a first step in the absence of a chain transfer agent; and, continuing to polymerize the isoolefin in a second step in the presence of a chain transfer agent to produce a polyisoolefin-based polymer composition comprising a multimodal molecular weight distribution comprising a low molecular weight fraction having a peak molecular weight ($M_p$) of less than about 100,000 g/mol and a high molecular weight fraction having a peak molecular weight ($M_p$) of greater than about 250,000 g/mol, the low molecular weight fraction present in the composition in an amount less than the high molecular weight fraction.

In accordance with a third aspect of the present invention, there is provided a cured article comprising a polyisoolefin-based polymer composition of the present invention.

The present invention advantageously provides a polyisoolefin-based polymer composition having improved processability while maintaining physical characteristics and dimensional stability of cured articles made from the polyisoolefin-based polymer composition. Improved processability leads to reduced mixing time and energy, reduced compounding cost and higher through-put and production. Further benefits may include reduced use of process oil, increased filler loading, improved impermeability and improved thermo-oxidative stability.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
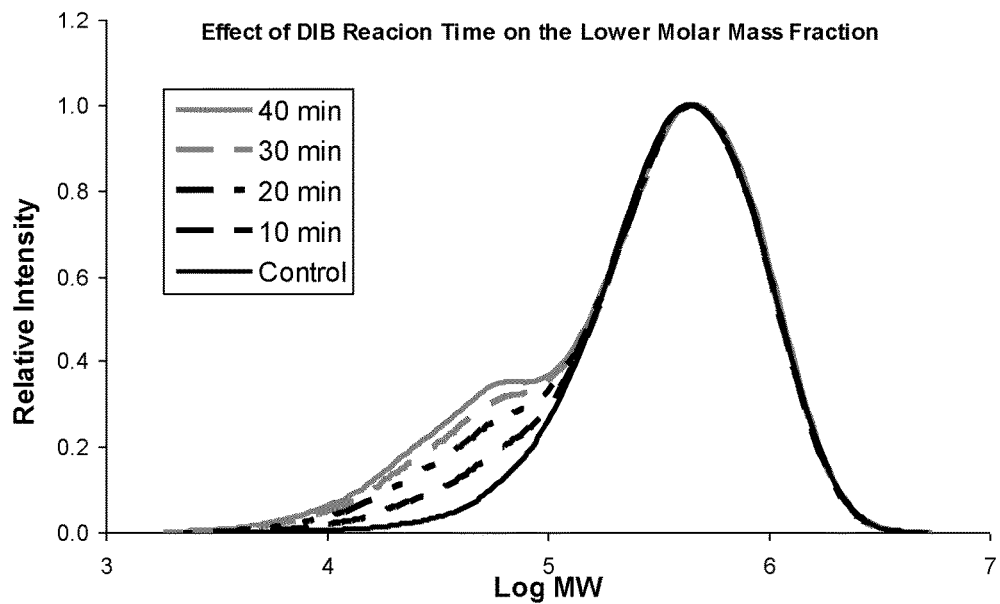
FIG. 1 depicts a gel permeation chromatogram (GPC) illustrating the effect of reaction time of diisobutylene (DIB) chain transfer agent on the production of a low molecular weight fraction in the solution co-polymerization of isobutylene and isoprene, where the chain transfer agent was added 30 minutes after initiation of the co-polymerization.

In this specification including the claims, the use of the article "a", "an", or "the" in reference to an item is not intended to exclude the possibility of including a plurality of the item in some embodiments. It will be apparent to one skilled in the art in at least some instances in this specification including the attached claims that it would be possible to include a plurality of the item in at least some embodiments.

The polyisoolefin-based polymer composition has a multimodal molecular weight distribution. There is a low molecular weight fraction having a peak molecular weight ($M_p$) of less than about 100,000 g/mol and a high molecular weight fraction having a peak molecular weight ($M_p$) of greater than about 250,000 g/mol. The low molecular weight fraction is present in the composition in an amount less than the high molecular weight fraction, thus the high molecular weight fraction is present in greater amount than the low molecular weight fraction. While the polymer composition comprises at least two distinct molecular weight peaks ($M_p$), there may be three, four, five or more distinct molecular weight peaks. In one embodiment, the polymer composition has a bimodal molecular weight distribution exhibiting two molecular weight peaks.

The amount of the low molecular weight fraction in the polymer composition may be less than about 50 wt % based on total weight of polymer, for example, no more than about 45 wt %, no more than about 40 wt %, no more than about 35 wt %, no more than about 30 wt %, no more than about 25 wt % or no more than about 20 wt %. The amount of the low molecular weight fraction in the polymer composition may be at least about 5 wt % based on total weight of polymer, for example, at least about 10 wt %, at least about 15 wt %, at least about 20 wt %, at least about 25 wt %, at least about 30 wt %, at least about 35 wt %, at least about 40 wt % or at least about 45 wt %, provided the amount of the low molecular weight fraction is less than the amount of the high molecular weight fraction. In various embodiments, the amount of the low molecular weight fraction may be within any combination of the limits expressed above. A particularly preferred range is 15-25 wt %. The $M_p$ of the low molecular weight fraction is less than about 100,000 g/mol. In some embodiments, the $M_p$ may be within a range of about 10,000 g/mol to about 100,000 g/mol, or about 25,000 g/mol to about 100,000 g/mol, or about 50,000 g/mol to about 100,000 g/mol.

The amount of the high molecular weight fraction in the polymer composition may be more than about 50 wt % based on total weight of polymer, for example, at least about 55 wt %, at least about 60 wt %, at least about 65 wt %, at least about 70 wt %, at least about 75 wt %, at least about 80 wt %, at least about 85 wt %. The amount of the high molecular weight fraction in the polymer composition may be no more than about 90 wt %, no more than about 85 wt %, no more than about 80 wt %, no more than about 75 wt %, no more than about 70 wt %, no more than about 65 wt %, no more than about 60 wt % or no more than about 55 wt %, provided the amount of the low molecular weight fraction is less than the amount of the high molecular weight fraction. In various embodiments, the amount of the high molecular weight fraction may be within any combination of the limits expressed above. A particularly preferred range is 85-75 wt %. The $M_p$ of the high molecular weight fraction is more than about 250,000 g/mol. In some embodiments, the $M_p$ may be more than about 300,000 g/mol. In some embodiments, the $M_p$ may be within a range of about 250,000 g/mol to about 2,000,000 g/mol, or about 300,000 g/mol to about 800,000 g/mol, or about 350,000 g/mol to about 600,000 g/mol, or about 350,000 g/mol to about 550,000 g/mol.

Polymer compositions of the present invention having a molecular weight distribution (MWD) with a low molecular weight tail do not adversely affect the physical properties of cured articles made from the polymer composition, but the polymer compositions show improved processability. The higher molecular weight peak is due to a high molecular weight fraction that results in a polyisoolefin-based material with excellent physical properties, while mitigating any negative effects due to the low molecular weight fraction. The high molecular weight fraction preferably has a narrow polydispersity index (PDI).

The present invention is not limited to a special polyisoolefin. However, polyisoolefins produced from isoolefin monomers having from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof are preferred. More preferred is isobutene (also called isobutylene). Polyisobutylene is one example of a polyisoolefin.

In an embodiment, the polyisoolefin-based polymer composition may comprise a copolymer of at least one isoolefin monomer and at least one other monomer. In a particularly preferred embodiment, the polyisoolefin-based material is a butyl rubber. Butyl rubbers are formed by the copolymerization of at least one isoolefin monomer and β-pinene or at least one multiolefin monomer. Every multiolefin copolymerizable with the isoolefin known by the skilled in the art can be used. However, multiolefin monomers having from 4-14 carbon atoms, such as isoprene, butadiene, 2-methylbutadiene, 2,4-dimethylbutadiene, piperylene, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof, preferably conjugated dienes, may be used. Isoprene is more preferably used.

Butyl rubber may optionally comprise further copolymerizable monomers, preferably cationically polymerizable monomers. As optional further monomers, any monomer copolymerizable with the isoolefins and/or dienes known by the skilled in the art can be used. Indene, styrene derivatives or mixtures thereof may be used as optional monomers. α-Methyl styrene, p-methyl styrene, chlorostyrene or mixtures thereof are preferably used. p-Methyl styrene is more preferably used.

Butyl rubber polymer can be subjected to a halogenation process in order to produce a halobutyl polymer. Bromination or chlorination can be performed according to the process known by those skilled in the art, for example, the procedures described in Rubber Technology, 3rd Ed., Edited by Maurice Morton, Kluwer Academic Publishers, pp. 297-300 and further documents cited therein. During halogenation, some or all of the multiolefin content of the butyl polymer is converted to allylic halides. The allylic halides in the halobutyl polymer are therefore repeating units derived from the multiolefin monomers originally present in the butyl polymer. The total allylic halide content of the halobutyl polymer cannot exceed the starting multiolefin content of the parent butyl polymer.

The halogenation agent may comprise elemental chlorine ($Cl_2$) or bromine ($Br_2$) and/or organo-halide precursors thereto, for example dibromo-dimethyl hydantoin, tri-chloro isocyanuric acid (TCIA), n-bromosuccinimide, or the like. Preferably, the halogenation agent comprises or is bromine. The amount of halogenation during this procedure may be controlled so that the final polymer has the preferred amounts of halogen described hereinabove. The specific mode of attaching the halogen to the polymer is not particularly restricted and those of skill in the art will recognize that modes other than those described above may be used while achieving the benefits of the invention. For additional details and alternative embodiments of solution phase halogenation processes, see, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company© 1987), particularly pp. 297-300, which are incorporated herein by reference.

The polymerization reaction may be performed in the presence of a Lewis acid (e.g. $AlCl_3$ or $AlCl_3$ derivable catalyst systems) and an initiator (e.g. a proton source and/or cationogen) capable of initiating the polymerization process. A proton source suitable in the present invention includes any compound that will produce a proton when added to the Lewis acid or a composition containing the Lewis acid. Protons may be generated from the reaction of the Lewis acid with proton sources to produce the proton and the corresponding by-product. Such reaction may be preferred in the event that the reaction of the proton source is faster with the protonated additive as compared with its reaction with the monomers.

Proton generating reactants include, for example such as water, alcohols, phenol thiols, carboxylic acids, and the like or any mixture thereof. Water, alcohol, phenol or any mixture thereof is preferred. According to the present invention, when low molecular weight polymer is desired an aliphatic or aromatic alcohol is preferred. The most preferred proton source is water. The preferred ratio of Lewis acid to proton source is between 5:1 to 100:1 by weight.

It may be advantageous to alternatively or further introduce other catalyst systems, for example diethylaluminium chloride, ethylaluminium chloride, titanium tetrachloride, stannous tetrachloride, boron trifluoride, boron trichloride, or methylalumoxane.

Alkyl halide catalyst systems are a particularly preferred class of Lewis acids for catalyzing solution polymerization reactions in accordance with the present invention. Examples of alkyl halide catalysts include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB) and any mixture thereof.

In addition to or instead of a proton source, a cationogen capable of initiating the polymerization process can be used. Suitable cationogen includes any compound that generates a carbo-cation under the conditions present. A preferred group of cationogens include carbocationic compounds having the formula:

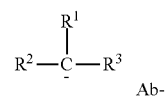

Abwherein $R^1$, $R^2$ and $R^3$, are independently hydrogen, or a linear, branched or cyclic aromatic or aliphatic group, the proviso that only one of $R^1$, $R^2$ and $R^3$ may be hydrogen. Preferably, $R^1$, $R^2$ and $R^3$, are independently a $C_1$ to $C_{20}$ aromatic or aliphatic group. Non-limiting examples of suitable aromatic groups are phenyl, tolyl, xylyl and biphenyl. Non-limiting examples of suitable aliphatic groups include methyl, ethyl, propyl, butyl, pentyl, hexyl, octyl, nonyl, decyl, dodecyl, 3-methylpentyl and 3,5,5-trimethylhexyl.

Another preferred group of cationogens includes substituted silylium cationic compounds having the formula:

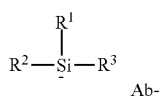

wherein $R^1$, $R^2$ and $R^3$, are independently hydrogen, or a linear, branched or cyclic aromatic or aliphatic group, with the proviso that only one of $R^1$, $R^2$ and $R^3$ may be hydrogen. Preferably, none of $R^1$, $R^2$ and $R^3$ is H. Preferably, $R^1$, $R^2$ and $R^3$ are, independently, a $C_1$ to $C_{20}$ aromatic or aliphatic group. More preferably, $R^1$, $R^2$ and $R^3$ are independently a $C_1$ to $C_8$ alkyl group. Examples of useful aromatic groups are phenyl, tolyl, xylyl and biphenyl. Non-limiting examples of useful aliphatic groups include methyl, ethyl, propyl, butyl, pentyl, hexyl, octyl, nonyl, decyl, dodecyl, 3-methylpentyl and 3,5,5-trimethylhexyl. A preferred group of reactive substituted silylium cations include trimethylsilylium, triethylsilylium and benzyldimethylsilylium. Such cations may be prepared, for example, by the exchange of the hydride group of the $R^1R^2R^3Si$—H with a non-coordinating anion (NCA), such as $Ph_3C^+B(pfp)_4^-$ yielding compositions such as $R^1R^2R^3SiB(pfp)_4$ which in the appropriate solvent obtain the cation.

According to the present invention, Ab– denotes an anion. Preferred anions include those containing a single coordination complex possessing a charge bearing metal or metalloid core which is negatively charged to the extent necessary to balance the charge on the active catalyst species which may be formed when the two components are combined. More preferably Ab– corresponds to a compound with the general formula $[MQ4]^-$ wherein M is a boron, aluminum, gallium or indium in the +3 formal oxidation state; and Q is independently hydride, dialkylamido, halide, hydrocarbyl, hydrocarbyloxide, halo-substituted hydrocarbyl, halo-substituted hydrocarbyloxide, or halo-substituted silylhydrocarbyl radicals.

The reaction mixture used to produce butyl rubber polymer may optionally further contain one or more branching agents, for example a multifunctional oligomer, a multiolefin cross-linking agent or a mixture thereof. The term branching agent denotes a compound that will react with a polymer to form side chains rather than extending the main chain. The term cross-linking agent is known to those skilled in the art and is understood to denote a compound that causes chemical cross-linking between the polymer chains in opposition to a monomer that will add to the chain. Some easy preliminary tests will reveal if a compound will act as a monomer or a cross-linking agent. The choice of the cross-linking agent is not restricted. Preferably, the cross-linking contains a multiolefinic hydrocarbon compound. Examples of these include norbornadiene, 2-isopropenyl-norbornene, 2-vinyl-norbornene, 1,3,5-hexatriene, 2-phenyl-1,3-butadiene, divinylbenzene (DVB), diisopropenyl-benzene, divinyltoluene, divinylxylene and $C_1$ to $C_{20}$ alkyl-substituted derivatives thereof. More preferably, the multiolefin crosslinking agent is divinylbenzene, diisopropenylbenzene, divinyltoluene, divinyl-xylene and $C_1$ to $C_{20}$ alkyl substituted derivatives thereof, and or mixtures of the compounds given. Most preferably the multiolefin cross-linking agent contains divinylbenzene and diisopropenyl-benzene.

In preparing butyl rubber polymers, preferably, the monomer mixture contains in the range of from about 80% to about 95% by weight of at least one isoolefin monomer and in the range of from about 4.0% to about 20% by weight of at least one multiolefin monomer and/or β-pinene. More preferably, the monomer mixture contains in the range of from 83% to 94% by weight of at least one isoolefin monomer and in the range of from 5.0% to 17% by weight of a multiolefin monomer or β-pinene. Most preferably, the monomer mixture contains in the range of from 85% to 93% by weight of at least one isoolefin monomer and in the range of from 6.0% to 15% by weight of at least one multiolefin monomer or β-pinene. When multiolefin cross-linking agents are used, they are provided in the range of from 0.01% to 1% by weight of the multiolefin cross-linking agent.

The monomers are generally polymerized cationically, preferably at temperatures in the range of from about −120° C. to about −50° C., preferably in the range of from about −100° C. to about −70° C., more preferably in a range of from about −98° C. to about −75° C., for example about −98° C. to about −90° C. The operating temperatures of about −98° C. and about −75° C. are particularly noteworthy. Preferred pressures are in the range of from 0.1 to 4 bar.

The polymerization process may be performed as a batch process in a batch reactor or a continuous process (e.g. a plug flow process) in a continuous reactor. It may be a solution process or a slurry process. Solution processes in a diluent are particularly preferred. For more economical production, a continuous process conducted in slurry (suspension) in a diluent may be used, as described in U.S. Pat. No. 5,417,930, the entire contents of which is herein incorporated by reference. The diluent may comprise one or more inert solvents known to the person skilled in the art. Such other inert solvents may be, for example, halogenated hydrocarbons other than hydrofluorocarbons (e.g. chloroalkanes), cycloalkanes or aromatics. Cycloalkanes and aromatics are frequently also mono- or polysubstituted with halogens, and are included in halogenated hydrocarbons other than hydrofluorocarbons when the halogen substituents are not fluorine atoms. Hexane/chloroalkane mixtures, methyl chloride, dichloromethane or the mixtures thereof are of particular note. In a continuous process, the process is preferably performed with at least the following feed streams.

I) solvent/diluent+isoolefin (preferably isobutene)+multiolefin (preferably diene, isoprene);
II) initiator system; and, optionally,
III) multiolefin cross-linking agent.

It should be noted that the multiolefin crosslinking agent can also be added in the same feed stream as the isoolefin and multiolefin. Further, the chain transfer agent may be in its own feed stream or part of another feed stream.

In a preferred embodiment of the invention the diluent comprises a common aliphatic medium comprising at least 80 wt % of one or more aliphatic hydrocarbons having a boiling point in the range of 45° C. to 80° C. at a pressure of 1013 hPa, preferably at least 90 wt %, and even more preferably at least 95 wt %. Aliphatic hydrocarbons having a boiling point in the range of 45° C. to 80° C. at a pressure of 1013 hPa include cyclopentane, 2,2-dimethylbutane, 2,3-dimethylbutane, 2-methylpentane, 3-methylpentane, n-hexane, methylcyclopentane and 2,2-dimethylpentane.

A C6 solvent is a particularly preferred choice for use in a solution process. A lower molecular weight solvent, such as C5 or lighter, has a boiling point close to the monomers and the monomers therefore may not be separable from the solution by distillation. A higher molecular weight solvent, such as C7 or heavier, would be more difficult to separate from the rubber after halogenation. The solution viscosity provided by use of a C7 solvent is also significantly higher than with a C6 solvent, making the solution more difficult to handle and impeding heat transfer in the reactor, even when provided with the high monomer to solvent ratios described above. As a result, the C6 solvents of the present invention are a preferred selection from among the available solvents. C6 solvents suitable for use in the present invention preferably have a boiling point of between 50° C. and 69° C. Examples of preferred C6 solvents include n-hexane or hexane isomers, such as 2-methyl pentane or 3-methyl pentane, or mixtures of n-hexane and such isomers as well as cyclohexane.

The common aliphatic medium may, for example, further comprise other compounds which are inert under polymerization conditions such as other aliphatic hydrocarbons, for example heptanes and octanes having a boiling point of more than 80° C. at a pressure of 1013 hPa, propanes, butanes, n-pentane, cyclohexane as well as halohydrocarbons such as methylchloride and other chlorinated aliphatic hydrocarbons which are inert under reaction conditions.

In another preferred embodiment of the invention the common aliphatic medium is substantially free of halohydrocarbons. As used herein the term "substantially free" means a content of halohydrocarbons within the common aliphatic medium of less than 2 wt %, preferably less than 1 wt %, more preferably less than 0.1 wt % and even more preferably absence of halohydrocarbons.

This multimodal molecular weight distribution may be achieved in situ by the addition of a chain transfer agent in the later stages of the polymerization process in a batch or continuous reactor. Late addition of chain transfer agent refers to the inclusion of the chain transfer agent after the polymerization process has been initiated. The chain transfer agent may be added 0.5 minutes or more, 5 minutes or more, 10 minutes or more, 15 minutes or more, 20 minutes or more, 25 minutes or more, 30 minutes or more, 35 minutes or more, or 40 minutes or more after initiation. The chain transfer agent is preferably added within 60 minutes of initiation, or within 45 minutes of initiation, or within 40 minutes, or within 35 minutes. In various embodiments, the time of addition of chain transfer agent may be within any combination of the limits expressed above. A continuous solution process generally has one or more reactors in series. To apply such a concept to a continuous reactor setup, the addition of a chain transfer agent can be made following the first (or more than one) reactor which provides a minimum residence time of at least 10 minutes or more, 15 minutes or more, 20 minutes or more, 25 minutes or more, 30 minutes or more, 35 minutes or more, or 40 minutes or more. These times can be adjusted by for example selecting appropriate flow rates, number of reactors used prior to addition of the chain transfer agent, or by changing the individual reactor volumes. The transfer of such a process for a batch reactor to a continuous process is well known to those skilled in the art.

Instead of basing the addition of chain transfer agent on absolute time, the late addition may be based on the conversion of monomers to polymer. For example, the chain transfer agent may be added when 2% or more conversion has been achieved, or 5% or more conversion, or 10% or more conversion, or 15% or more conversion, or 20% or more conversion, or 25% or more conversion, or 30% or more conversion, or 35% or more conversion, or 40% or more conversion, or 45% or more conversion, or 50% or more conversion. The chain transfer agent is preferably added within 15% to 25% conversion. The timing will depend on the ultimately desired final conversion value and on the desired properties of the final polymer composition. This concept can also be transferred to a continuous solution process. A continuous solution process generally has one or more reactors in series. The conversion of monomers to polymer can be modified by changing flow rates, initiator concentration, number of reactors or overall reactor volume to meet a target conversion prior to the late addition of a chain transfer agent along the reactor train. For example, the chain transfer agent may be added along the reactor series when 2% or more conversion has been achieved, or 5% or more conversion, or 10% or more conversion, or 15% or more conversion, or 20% or more conversion, or 25% or more conversion, or 30% or more conversion, or 35% or more conversion, or 40% or more conversion, or 45% or more conversion, or 50% or more conversion. The chain transfer agent is preferably added within 15% to 25% conversion. The timing will depend on the ultimately desired final conversion value and on the desired properties of the final polymer composition.

The chain transfer agent is preferably added in an amount of more than 0.1 wt %, and less than 20 wt %, most preferably between 0.5 and 5 wt % based on the amount of isobutylene used. The type and amount of the chain transfer agent is dependent on the desired molecular weight distribution. For multimodal molecular weight distributions that require minimal additional low molecular weight material, small amounts of chain transfer agent are added, while for maximal low molecular weight material, significantly higher amounts of chain transfer agent are required. The chain transfer agent should preferably be a strong chain transfer agent. It should be capable of reacting with the growing polymer chain, terminate its further growth and subsequently initiate a new polymer chain. Use of a weak chain transfer agent should be avoided as this can lead to uneconomical processes which require significant purification steps of the resulting polymer to remove residual chain transfer agents that may interfere with subsequent cure or the resulting physical properties of the final product.

The strength of the chain transfer agent may be determined conventionally (see for example *J. Macromol. Sci.-Chem.*, A1(6) pp 995-1004 (1967), Kennedy et al.). The transfer constant (transfer coefficient) expresses the strength of the chain transfer agent. According to the data published in this paper the transfer constant of 1-butene is 0. Preferably the chain transfer agent has a transfer coefficient of at least 1, more preferably at least about 10, even more preferably at last about 50.

The chain transfer agent may comprise, but is not limited to: piperylene, 1-methylcycloheptene, 1-methyl-cyclopentene, 2-ethyl-1-hexene, indene, 2,4,4-trimethyl-1-pentene (diisobutylene, DIB), 2,4,4-trimethyl-2-pentene, 2-chloro-2,4,4-trimethylpentane (TMP-Cl), dialkylethers, diaryl ethers, substituted aryl groups (e.g. toluene, anisole, thiophene, p-xylene or p-chloroanisole) and alkylvinylethers. The most preferred chain transfer agent is 2,4,4-trimethyl-1-pentene (diisobutylene, DIB). Chain transfer agents are generally known in the art, for example as described in U.S. Pat. No. 6,841,642, the contents of which are herein incorporated by reference.

In one embodiment, the late addition of chain transfer agent may be done after all of the process reactants have been mixed and the polymerization initiated. However, a variety of process variations may be implemented in conjunction with the late addition of chain transfer agent to obtain specific effects. These processes may involve the late addition of additional monomers, oligomers, branching (crosslinking) agents or other ingredients normally associated with the polymerization reaction. Some specific examples are as follows.

In conjunction with the late addition of one or more co-monomers and/or branching agents (e.g. multi-functional oligomers, multiolefin crosslinking agents), especially in batch solution polymerization processes, the late addition of chain transfer agent leads to greater incorporation of the functional co-monomers and/or substantial branching in the low molecular weight fraction a material which displays. Such a material can display increased reactivity and filler interactions compared to traditional butyl rubber. Adjusting the timing of addition permits selective incorporation of co-monomers and/or branching into the low molecular weight fraction and tuning of the polymer composition properties. For example, the late addition of a multiolefin co-monomer (e.g. isoprene) along with late addition of the chain transfer agent results in selective incorporation of the multi-olefin into the low molecular weight fraction. This results in a polymer composition having low multi-olefin content in the high molecular weight fraction (e.g. 0.5-2.5 mol %) and high multi-olefin content in the low molecular weight fraction (e.g. 2.5-15 mol %, or 3.0-10 mol %).

In conjunction with the late addition of high vinyl resin, the late addition of chain transfer agent, especially in batch solution polymerization processes, also leads to a highly branched, low molecular weight fraction with increased reactivity and filler interactions.

In conjunction with adjusting process variables (e.g. temperature, mixing rate, residence time) in continuous solution processes, the late addition of chain transfer agent permits adjusting of the molecular weight distribution of the polymer composition.

In conjunction with late addition of initiator or staged addition of initiators in a batch or continuous solution polymerization, late addition of chain transfer agent permits an increase monomer conversion, thereby adjusting the molecular weight distribution toward the low molecular weight fraction.

Late addition of chain transfer agent may be accomplished through subsequent addition of a second slurry containing co-monomer (e.g. isoprene) and the chain transfer agent in a dual reactor slurry polymerization process. This permits an increase in co-monomer content of the low molecular fraction arising from a slurry polymerization process.

The polymer composition may be formed into a shaped article and then cured. The preferred curing system is sulphur based. A typical sulfur-based curing system comprises: (i) a metal oxide, (ii) elemental sulfur and (iii) at least one sulfur-based accelerator. The use of metal oxides as a component in the curing system is well known in the art. A suitable metal oxide is zinc oxide, which is typically used in the amount of from about 1 to about 10, preferably from about 2 to about 5, parts by weight per hundred parts by weight polymer in the composition. Elemental sulfur, comprising component (ii) of the preferred curing system is typically used in amounts of from about 0.2 to about 10 parts by weight per hundred parts by weight polymer in the composition. Suitable sulfur-based accelerators (component (iii) of the preferred curing system) are typically used in amounts of from about 0.5 to about 3 parts by weight, per hundred parts by weight polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). Preferably, the sulphur based accelerator is mercaptobenzothiazyl disulfide.

The cured article may contain further auxiliary products for polymers (e.g. rubbers), such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts that depend, inter alia, on the intended use. The cured article may also contain mineral and/or non-mineral fillers. Conventional amounts are from 0.1 to 50 wt %, based on rubber. Further information on vulcanization processes may be obtained in Encyclopedia of Polymer Science and Engineering, Vol. 17, s. 666 et seq. (Vulcanization).

The cured article may comprise one or more aspects which are considered as improved processability due to reduced composition viscosity and elasticity and improved impermeability due to higher filler loading or reduced processing oil loading. Cured articles may be, for example, tire inner liners, tire inner tubes, seals, gaskets or pharmaceutical closures.

EXAMPLES

Materials and Reagents

Isoprene (IP) was purified by distillation over $CaH_2$ and was stored in a sealed bottle in the freezer. Ethylaluminum dichloride (EADC) and Diethylaluminum chloride (DEAC) were purchased from Sigma-Aldrich as a 1.0 M solution in hexanes and used as received. Anhydrous hexanes (Sigma-Aldrich) was dried using an MBraun MB-SPS solvent purification system and piped directly into the drybox for use. 2,4,4-trimethyl-1-pentene (DIB, diisobutylene) was purchased from Sigma-Aldrich and used as received.

Characterization

Molecular weights were measured by a Waters Alliance 2690/5 Separations Module with three 7.8 mm×300 mm, 10 μm mixed bed columns and a Waters 410 dRI detector both thermostated at 35° C. The mobile phase was OmniSolv™ grade stabilized THF (EMD Chemicals) with a 0.8 mL/min flow rate and narrow MWD polystyrene standards with toluene used as internal reference. The instrument was calibrated using the universal calibration principle with Mark Houwink constants for butyl rubber and molecular weights were calculated using Waters' Empower2™ software.

Microstructure analysis of the polymer was performed by $^1H$ NMR using a Bruker DRX500 spectrometer (500 MHz) in $CDCl_3$ using one hundred scans with chemical shifts referenced to tetramethylsilane. $^1H$ NMR data was collected with a relaxation delay of 10 seconds.

Compounding

Compounds were mixed using standard laboratory techniques, and all ingredients were used as received.

Sulfur cure: Halogenated butyl rubber was added to a Brabender internal mixer with roller rotors (350 g capacity) at 60° C. and 60 rpm. The rubber was allowed to mix alone for a short period of time (1 minute) followed by the addition of Resin SP1068, stearic acid, Sunpar™ 2280 and carbon black. A sweep was performed at 4 minutes. The compound was mixed for approximately 7 minutes in total. Curatives (Sulfur, MBTS and Zinc Oxide) were then added on a two roll mill. After final ingredient addition was complete, the compound was refined with a minimum of 6 three-quarter cuts and 6 endwise passes.

For non-Halogenated Butyl Compounds: The butyl rubber was added to a Brabender internal mixer with roller rotors (350 g capacity) at 60° C. and 60 rpm. The rubber was allowed to mix alone for a short period of time (1 minute) followed by the addition of stearic acid and carbon black. A sweep was performed at 4 minutes. The compound was mixed for approximately 7 minutes in total. Curatives (Sulfur, Vulkacit Thiuram/C and Zinc Oxide) were then added on a two roll mill. After final ingredient addition was complete, the compound was refined with a minimum of 6 three-quarter cuts and 6 endwise passes.

Cure properties were assessed using a Moving Die Rheometer (MDR). Approximately 6 g (+/−0.5 g) of compound were analyzed by MDR cure using a MDR 2000 at a temperature of 160° C. for 30 min with 1° arc following ASTM D-5289. Various cure characteristics (including t905 and $\Delta S'$) were recorded.

Mooney Viscosity: Compound Mooney viscosity measurements were conducted at 125° C. using the MV 2000 rotational viscometer manufactured by Monsanto according to ASTM D1646. For raw polymer Mooney viscosity, the preheat time was 1 min followed by an 8 min run time.

Stress strain dumbbells were cured at 160° C. for $t_c90+5$ and tested using the Alpha T2000 tensile tester at room temperature and at 100° C. The ASTM D412 procedure was followed to test samples.

Preparation of Multimodal Butyl Rubber

Reactions were carried out in an MBRAUN dry box (MB 200G) at −80° C. Polymerizations were carried out in 500 mL round-bottom flasks equipped with an overhead stirrer. Ethylaluminum sesquichloride (EASC) initiator solution was prepared by combining 8.0 mL hexanes, 1.0 mL DEAC (1.0 M in hexanes), and 1.0 mL EADC (1.0 M in hexanes) in a 100 mL Erlenmeyer flask with addition of 40 µL water while stirring.

Polymerization was conducted in a 500 mL round-bottom flask. A stir rod with a stir blade was inserted into the center opening of the flask and an overhead mechanical stir drive was used to stir the reactions. The isobutylene (80 mL) added to a reaction vessel in combination with hexanes (40 mL) and isoprene (2.4 mL). A thermocouple was placed into one of the remaining necks of the flask, and once the reaction had reached −80° C., 2.0-3.0 mL of 2.0 M EASC initiator was added (Stage 1). At a specific time, 2,4,4-trimethyl-1-pentene (DIB) was added to the reaction flask and the polymerization was allowed to proceed for the times outlined below (Stage 2).

Following the completion of the polymerization reactions at Stage 2, the reactions were terminated by adding 1.0 mL of NaOH/EtOH solution (2.5 g NaOH dissolved in 250 mL ethanol). The polymer was isolated and dried overnight in a vacuum oven at 65° C.

Table 1 displays results of polymerization reactions conducted with varying stage 2 times.

TABLE 1

| Ex. | DIB (mL) | Stage 1 (min) | Stage 2 (min) | Yield (%) | % Solids | Mooney (MU) | mol % IP |
|---|---|---|---|---|---|---|---|
| 1 | 0.0 | 30 | 0.0 | 13.4 | 9.2 | 44 | 1.93 |
| 2 | 2.0 | 30 | 10 | 11.8 | 8.1 | 41 | 1.86 |
| 3 | 2.0 | 30 | 20 | 10.6 | 7.3 | 36 | 1.84 |
| 4 | 2.0 | 30 | 40 | 6.4 | 4.4 | n/a | 1.85 |

*Mooney values obtained using the RPA and a Mooney correlation equation

GPC traces of each sample (FIG. 1) are indicative of significant chain transfer reactions caused by the addition of DIB that leads to the formation of a low molecular weight fraction. The butyl samples produced (Ex. 1 to Ex. 4) have a characteristic low molecular weight tail which becomes noticeably larger as DIB reaction times are increased. Thus, reaction time following DIB addition has a dramatic effect on the shape of the molecular weight distribution and the Mooney viscosity of the resulting material.

It should be noted that the isoprene levels are consistent for each reaction, but the Mooney viscosity is significantly affected by the increased DIB reaction times.

Table 2 displays the analytical data of varying DIB reaction times.

TABLE 2

| Ex. | Stage 1 (min) | Stage 2 (min) | $M_n$ (Da) | $M_w$ (Da) | $M_p$ (Da) | PDI | % Polys <100 |
|---|---|---|---|---|---|---|---|
| 1 | 30 | 0.0 | 207045 | 442846 | 329608 | 2.14 | 8.791 |
| 2 | 30 | 10 | 147197 | 441171 | 343756 | 3.00 | 13.335 |
| 3 | 30 | 20 | 122419 | 414846 | 344916 | 3.39 | 17.111 |
| 4 | 30 | 40 | 82417 | 368155 | 356064 | 4.47 | 25.923 |

Figure 2:
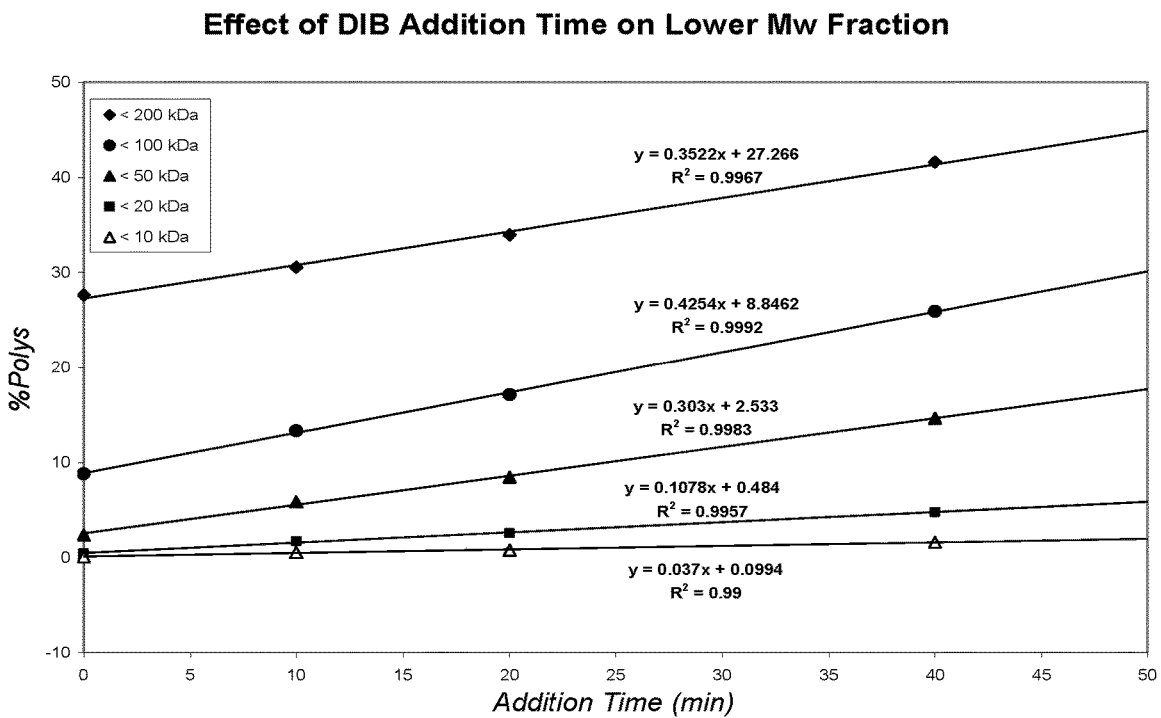
FIG. 2 depicts a graph showing the effect of DIB reaction time on the amount of low molecular weight fraction produced in the solution co-polymerization of isobutylene and isoprene, where the DIB was added 30 minutes after initiation of the co-polymerization.

The molecular weight data is summarized in Table 2 and also indicates that longer DIB reaction times result in a greater percent of polymer below a specified molecular weight (100 kDa) due to chain transfer reactions (% Polys<100). The GPC data was analyzed to determine the percent of polymer below a specified limit. This data shows a strong correlation between the DIB reaction time and the progression of the low molecular weight fraction(s) (FIG. 2). This data reinforces that longer DIB addition times result in a significant increase in the amount of low molecular weight chains within the sample.

Figure 3:
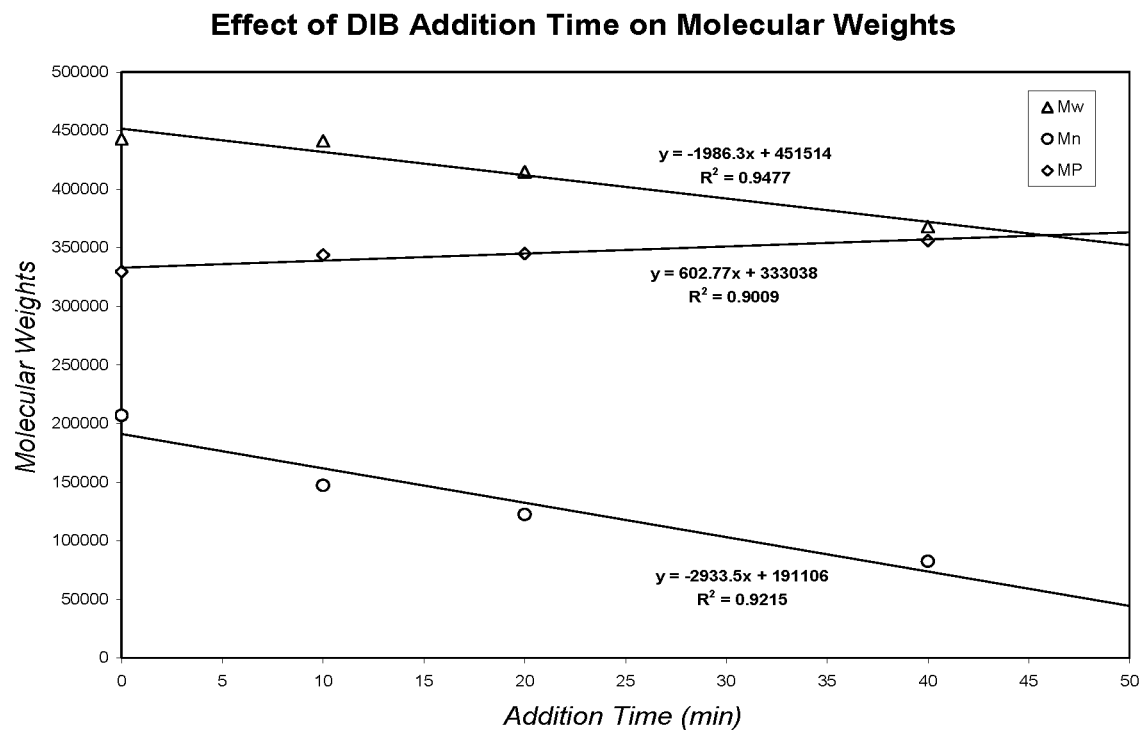
FIG. 3 depicts a graph showing the effect of DIB reaction time on molecular weights $M_p$, $M_w$ and $M_n$ of the entire polymer composition in the solution co-polymerization of isobutylene and isoprene, where the chain transfer agent was added 30 minutes after initiation of the co-polymerization.

It should also be noted that while the $M_w$ and $M_n$ values decrease with increasing DIB reaction times, the $M_p$ generally remains the same (FIG. 3). Therefore, the data suggests that the DIB serves to reduce the average length of polymer chains that are initiated later in the reaction, while leaving the fraction of high molecular weight chains from the first stage of the polymerization unaffected. As the DIB reaction times become longer, the low molecular weight fraction increases, thereby decreasing both the $M_w$ and $M_n$ while maintaining a constant $M_p$.

Preparation of Multimodal Butyl Rubber (EP-IIR) with Varying Amounts of DIB

Polymerization reactions were conducted in which different amounts of DIB was added after 30 min of reaction time (stage 1), and allowed to react for 40 min. Table 3 displays the effects of varying levels of chain transfer agent late to the reaction.

TABLE 3

| RXN | DIB (mL) | Stage1 (min) | Stage2 | $M_n$ (Da) | $M_w$ (Da) | $M_p$ (Da) | PDI | % Polys <100 |
|---|---|---|---|---|---|---|---|---|
| 5 | 0 | 30 | 40 | 270476 | 568436 | 470509 | 2.10 | 6.0 |
| 6 | 0.5 | 30 | 40 | 158744 | 452469 | 408763 | 2.85 | 16.0 |
| 7 | 1 | 30 | 40 | 117521 | 461764 | 476514 | 3.93 | 20.9 |
| 8 | 2 | 30 | 40 | 124156 | 523137 | 496906 | 4.21 | 16.3 |
| 9 | 4 | 30 | 40 | 129788 | 511210 | 455361 | 3.94 | 12.4 |

Figure 4:
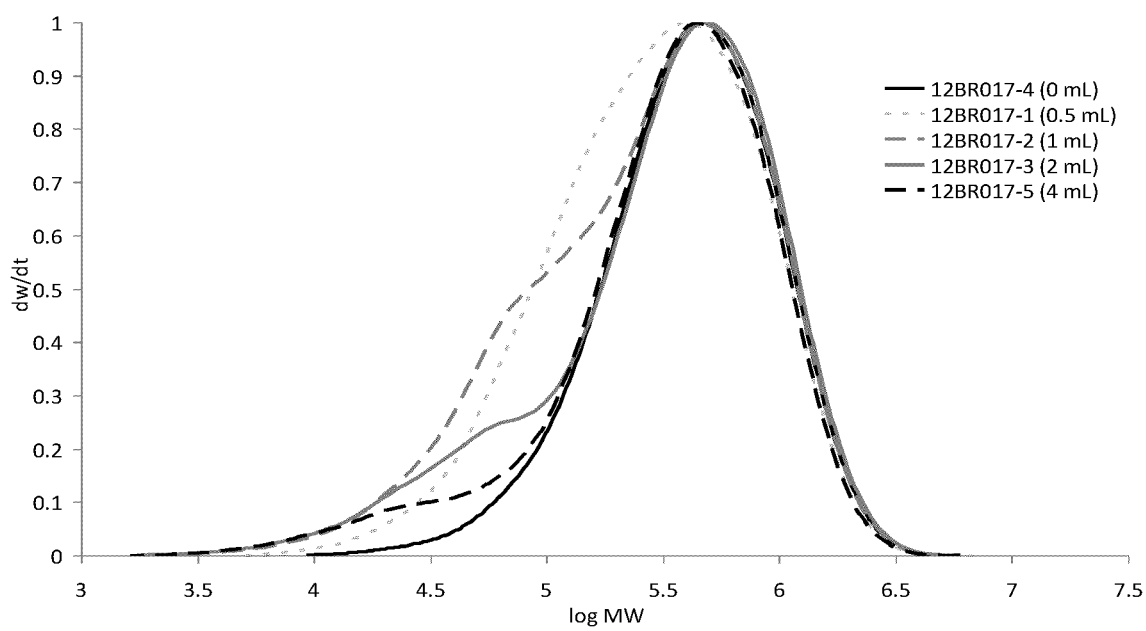
FIG. 4 depicts a gel permeation chromatogram (GPC) illustrating the effect of increasing amounts of diisobutylene (DIB) chain transfer agent on the production of a low molecular weight fraction in a third trial of the solution co-polymerization of isobutylene and isoprene, where the chain transfer agent was added 30 minutes after initiation of the co-polymerization.

The butyl samples produced have a characteristic low molecular weight fractions which are directly proportional to the amount of DIB added due to chain transfer reactions. The GPC plots are displayed in FIG. 4. With lower levels of DIB, the enhancement of the low MW appears more as a broadening of the MWD. As the amount of the DIB increases, so too is there a significant reduction in the molecular weight of the butyl chains made late in the polymerization. Thus, the amount of chain transfer agent added after initiation has a significant effect on the molecular weight distribution.

Comparison of Brominated Multimodal Butyl Rubber (EP-BIIR) to BB2030

Figure 5:
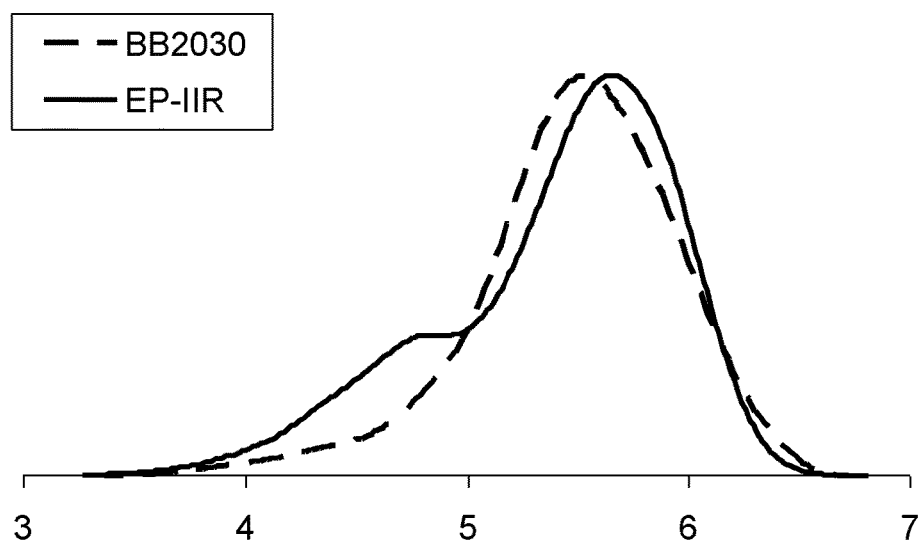
FIG. 5 depicts a graph comparing the molecular weight distribution of polymers in EP-IIR compared to commercially available BB2030.

Two samples of butyl rubber (EP-IIR), one having about 15 wt % and another having about 20 wt % of the low molecular weight fraction were prepared in accordance with the procedure as described above. These samples were brominated using methods described in the prior art to produce EP-BIIRs. The properties of the EP-BIIRs were compared to a commercial grade BIIR (BB2030). FIG. 5 depicts a graph comparing the molecular weight distributions (MWD) in EP-IIR as compared to BB2030. It can be seen that EP-IIR has a higher $M_p$, narrower polydispersity index (PDI) and a bimodal molecular weight distribution with an enhanced low molecular weight tail compared to BB2030.

Table 4 shows further results. The EP-BIIRs have higher peak molecular weights ($M_p$) than BB2030, but lower Mooney viscosities. Thus, EP-BIIRs are expected to have better processing characteristics while displaying equivalent or better physical properties than BB2030.

TABLE 4

| Sample | Mol % Exo Br | Mooney | $M_p$ (kDa) | % Polys < 100 |
|---|---|---|---|---|
| BB2030 (12%) | 0.77 | 32 | 315 | 12 |
| EP-BIIR (15%) | 0.88 | 25 | 344 | 15 |
| EP-BIIR (20%) | 0.88 | 25 | 394 | 20 |

Comparison of Tire Inner Lines Formed from EP-BIIR and BB2030

Halogenated butyl rubber was added to a Brabender internal mixer with roller rotors (350 g capacity) at 60° C. and 60 rpm. The rubber was allowed to mix alone for a short period of time (1 minute) followed by the addition of Resin SP1068, stearic acid, Sunpar™ 2280 and carbon black. A sweep was performed at 4 minutes. The compound was mixed for approximately 7 minutes in total. Curatives (Sulfur, MBTS and Zinc Oxide) were then added on a two roll mill. After final ingredient addition was complete, the compound was refined with a minimum of 6 three-quarter cuts and 6 endwise passes Examples 5 and 6 were produced from using the following formulation:

| Ingredient | (phr) |
|---|---|
| BIIR | 100 |
| Carbon Black (N660) | 60 |
| Resin SP1068 | 4 |
| Stearic Acid | 1 |
| Sunpar ™ 2280 | 7 |
| Sulfur | 0.5 |
| MBTS | 1.3 |
| Zinc Oxide | 3 |

Figure 6:
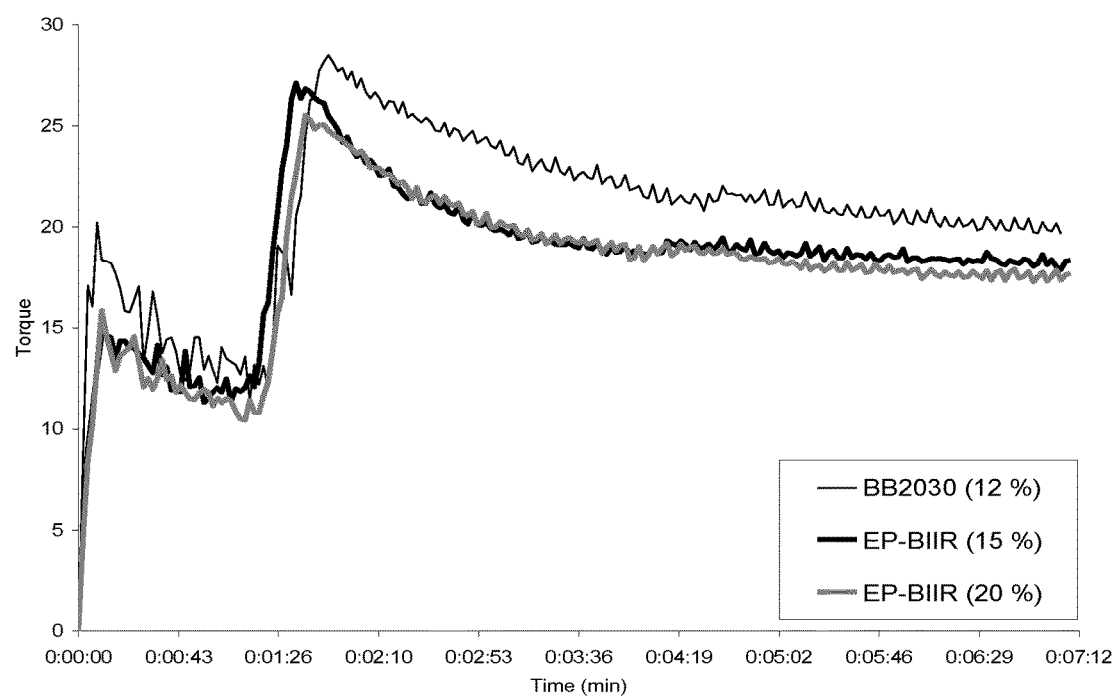
FIG. 6 depicts a graph of torque vs. time demonstrating the mixing energies required to formulate tire liners from brominated bimodal butyl rubbers (EP-IIRs) of the present invention compared to a commercially available brominated butyl rubber (BB2030)
Figure 7:
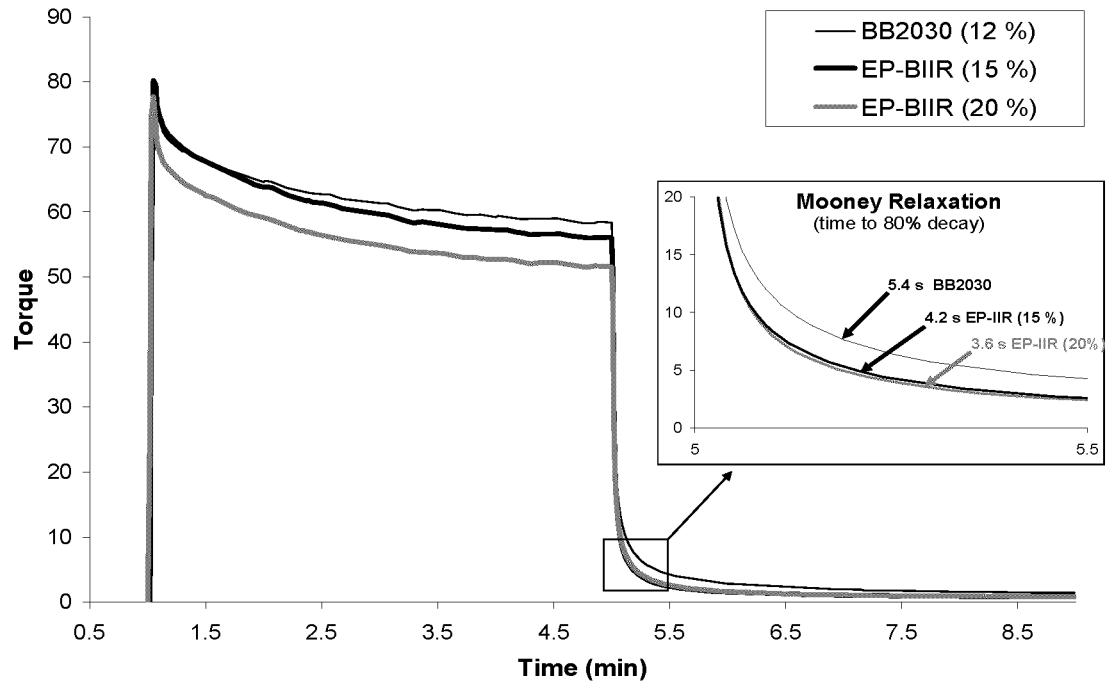
FIG. 7 depicts a graph of torque vs. time demonstrating relaxation properties of tire liners formulated from brominated bimodal butyl rubbers (EP-IIRs) of the present invention compared to a commercially available brominated butyl rubber (BB2030)
Figure 8:
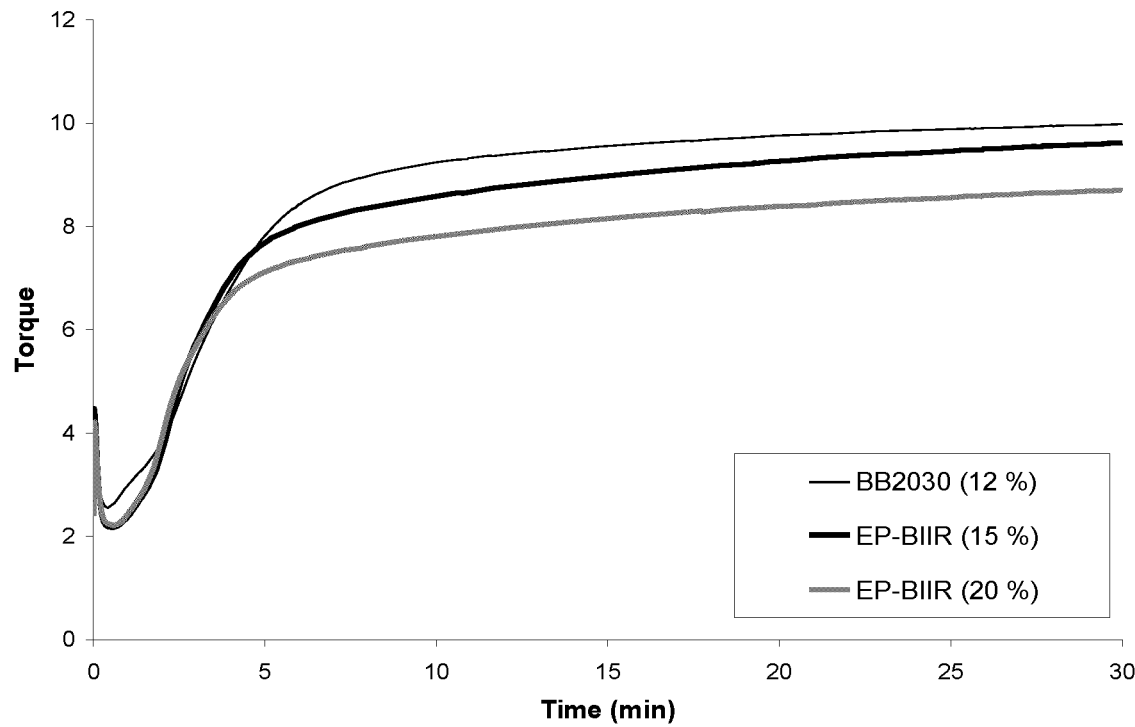
FIG. 8 depicts a graph of torque vs. time demonstrating cure characteristics of brominated bimodal butyl rubbers (EP-IIRs) of the present invention compared to a commercially available brominated butyl rubber (BB2030)
Figure 9:
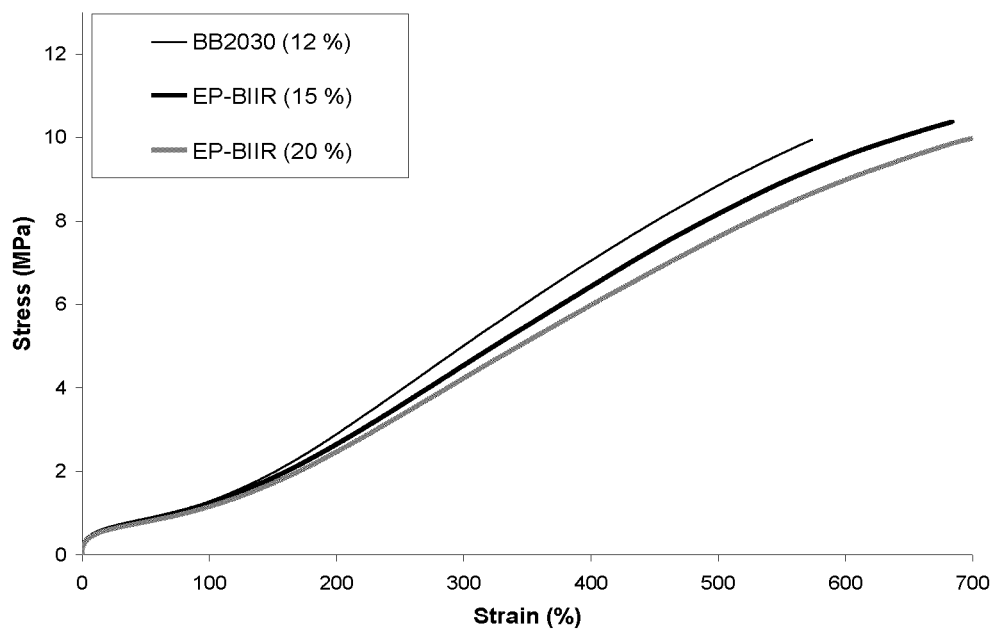
FIG. 9 depicts a graph of stress vs. strain demonstrating tensile properties of brominated bimodal butyl rubbers (EP-IIRs) of the present invention compared to a commercially available brominated butyl rubber (BB2030).

FIG. 6 demonstrates that EP-BIIRs require less mixing energy than BB2030 to formulate the tire liner. This will reduce the production costs significantly. FIG. 7 demonstrates that EP-BIIR compounds have improved relaxation properties over BB2030 compounds. This can be an advantage for calendaring or extrusion of such rubber compounds as the material can be sheeted or extruded at higher rates to increase throughput during the manufacturing of rubber goods without significant investment in new equipment. FIG. 8 demonstrates that EP-BIIRs has a slightly reduced minimum and final torque values, but the overall rate and state of cure remain similar to conventional BB2030 compounds. FIG. 9 demonstrates that EP-BIIRs have slightly reduced tensile properties compared to BB2030, but this can be compensated for using various compounding techniques known to those skilled in the art. For example, one could increase the cure state of the compound by increasing the level of curatives, or by increasing the content of bromine or isoprene in the base polymer.

Comparison of EP-IIR with Commercially Available Butyl Rubber (RB402)

The scale of the polymerization was increased to allow for enough material to be produced in a single reaction to perform a compounding study. Here the solution polymerization was conducted in a wide mouth 2000 mL round bottom flask. A stir rod with a Teflon™ stir blade and a bearing was inserted into the center opening of the flask and an overhead mechanical stir drive was used to stir the reactions. The isobutylene (480 mL) was measured at the bath temperature using a pre-cooled 500 mL graduated cylinder. This was then transferred to the reaction vessel in combination with hexanes (240 mL) and isoprene (14.4 mL). A thermocouple was placed into the solution, and once the reaction had reached the preferred temperature (−80° C.), 12.0-16.0 mL of 2.0 M EASC initiator was added to the reaction vessel to initiate the solution polymerization. After a given time (30 min), 2,4,4-trimethyl-1-pentene (DIB) (12.0 mL) was added to the reaction flask and the polymerization was allowed to proceed for an additional 40 min.

Here the processing and cure characteristics of a butyl rubber with an enhanced low molecular weight fraction (EP-IIR, Ex. 8) is compared to a current commercial sample (RB402, Ex. 7) of similar Mooney viscosity. The EP-IIIR was generated to match the Mooney viscosity of the commercial grade. Table 5 provides the corresponding analytical data for these polymers.

TABLE 5

Analytical data for EP-IIR Reaction Series 2012-33/37 compared to commercially available butyl rubber sample

| Sample | $M_n$ (kDa) | $M_w$ (kDa) | $M_p$ (kDa) | PDI | Mooney (MU) | mol % IP |
|---|---|---|---|---|---|---|
| 7 | 124 | 458 | 332 | 3.71 | 34 | 1.88 |
| 8 | 168 | 481 | 422 | 2.87 | 34 | 1.86 |

A standard sulfur cure compound was chosen as a basis to compare the mixing, cure and initial physical properties of the vulcanizates. A compound based on the EP-IIR was mixed using Ex. 8 and compared to a formulation based on a commercially available RB402 (see Table 5). The compound formulation was as follows (where IIR represents either the EP-IIR or RB402 samples):

| Ingredient | (phr) |
|---|---|
| IIR | 100 |
| Carbon Black (IRB#7) | 50 |
| Stearic Acid | 1 |
| Sulfur | 1.75 |

| Ingredient | (phr) |
|---|---|
| Vulkacit Thiuram/C | 1 |
| Zinc Oxide | 3 |

Figure 10:
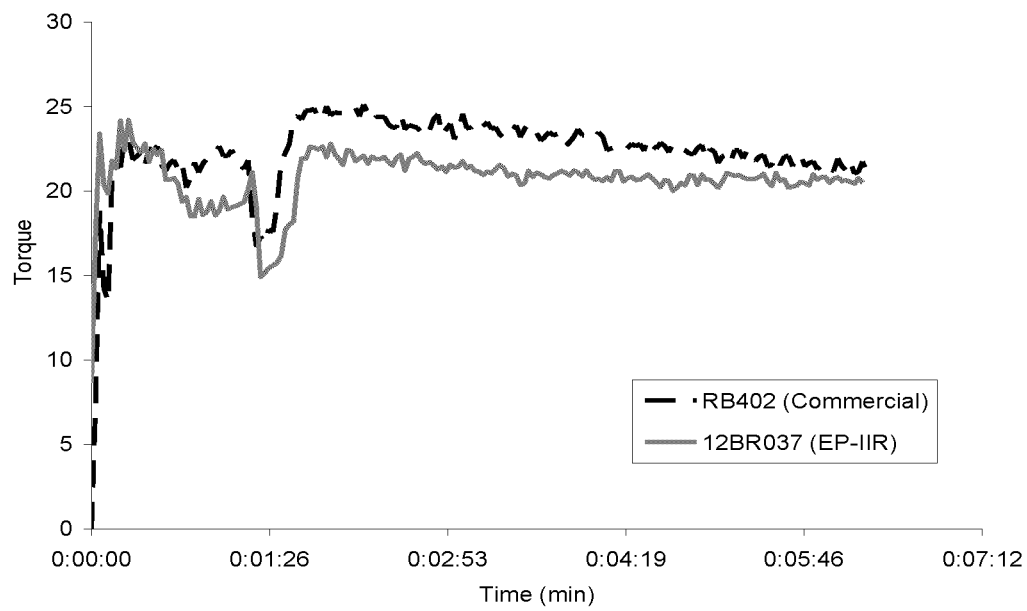
FIG. 10 depicts a graph of torque vs. time demonstrating the mixing energies required to formulate a standard compound from regular bimodal butyl rubber (EP-IIR) of the present invention compared to a commercially available butyl rubber (PB402) with a similar raw polymer Mooney Viscosity.
Figure 11:
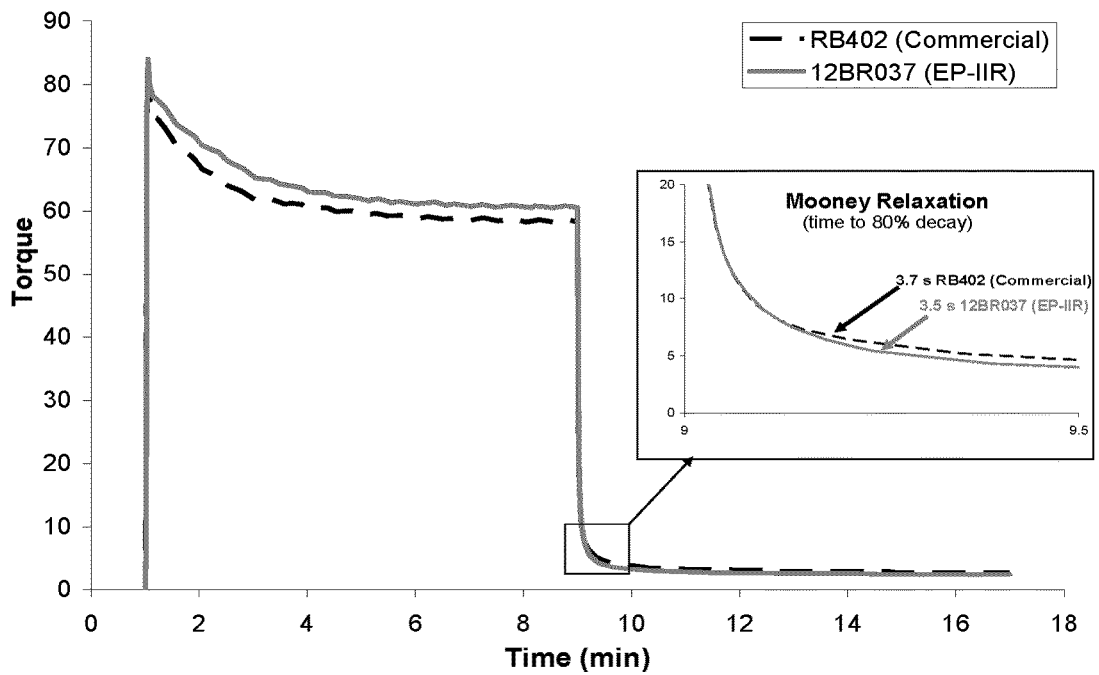
FIG. 11 depicts a graph of torque vs. time demonstrating relaxation properties of compounds formulated from bimodal butyl rubber (EP-IIR) of the present invention compared to a commercially available butyl rubber (RB402)
Figure 12:
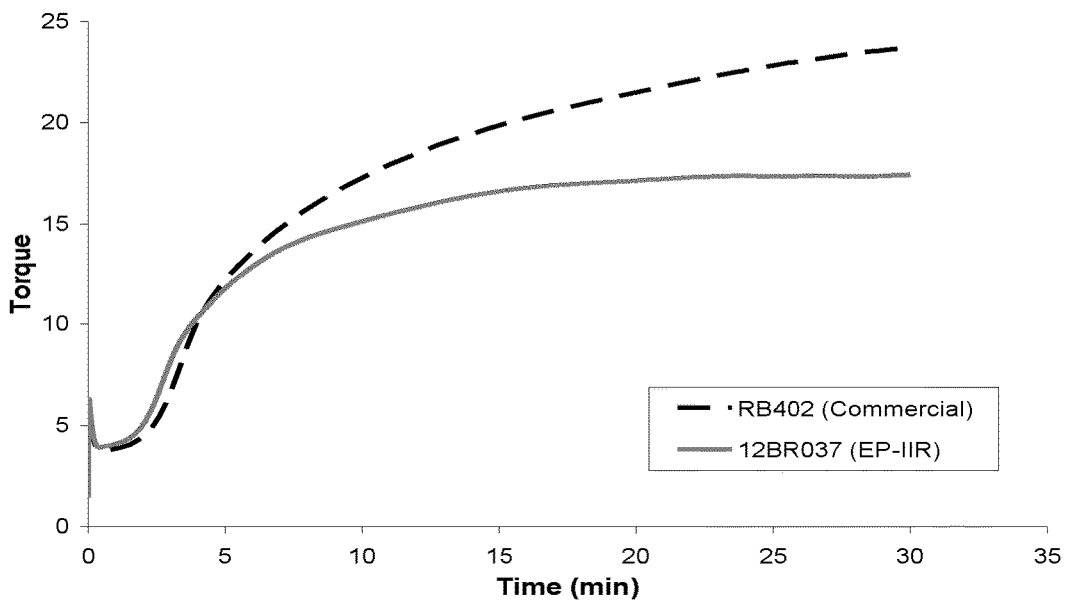
FIG. 12 depicts a graph of torque vs. time demonstrating cure characteristics of regular bimodal butyl rubber (EP-IIR) of the present invention compared to a commercially available butyl rubber (RB402); and, FIG. 13 depicts a graph of stress vs. strain demonstrating tensile properties of regular bimodal butyl rubber (EP-IIR) of the present invention compared to a commercially available butyl rubber (RB402).
Figure 13:
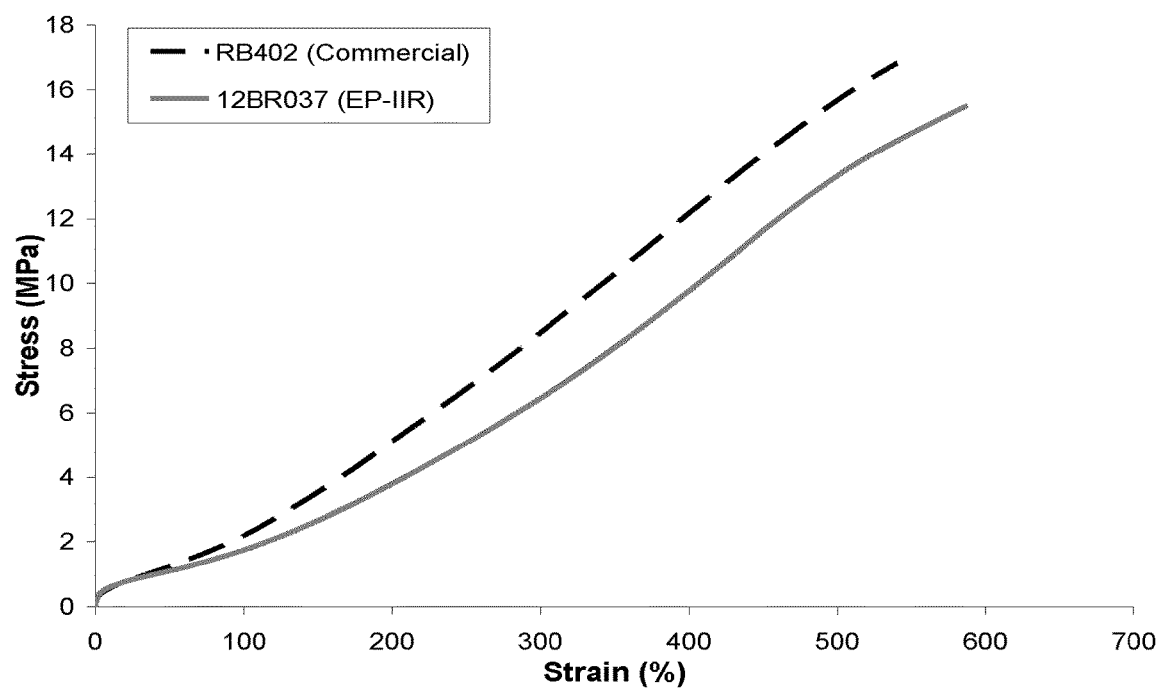

FIG. 10 demonstrates that EP-IIR requires less mixing energy than the RB402 compound using a standard formulation. This demonstrates the ability of these new EP-IIR materials to reduce the production costs significantly for a variety of different compounds. FIG. 11 demonstrates that the EP-IIR compound has improved relaxation properties over the RB402 compound (even with a higher initial compound Mooney). This can be an advantage for calendaring or extrusion of such rubber compounds as the material can be sheeted or extruded at higher rates to increase throughput during the manufacturing of rubber goods without significant investment in new equipment. FIG. 12 demonstrates that the EP-IIR has a reduced final torque value, but similar cure rate as the commercial RB402 compound. FIG. 13 demonstrates that EP-IIR has slightly reduced tensile properties compared to RB402 the compound, but this can be compensated for using various compounding techniques known to those skilled in the art. For example, one could increase the cure state of the compound by increasing the level of curatives, or by increasing the content of isoprene in the base polymer.

The novel features of the present invention will become apparent to those of skill in the art upon examination of the detailed description of the invention. It should be understood, however, that the scope of the claims should not be limited by the preferred embodiments set forth in the examples, but should be given the broadest interpretation consistent with the specification as a whole.

What is claimed is:

1. A process for producing a polyisoolefin-based polymer composition having a multimodal molecular weight distribution, the process comprising: polymerizing an isoolefin in a first step in the absence of a chain transfer agent; and, continuing to polymerize the isoolefin in a second step in the presence of a chain transfer agent to produce a polyisoolefin-based polymer composition comprising a multimodal molecular weight distribution comprising a low molecular weight fraction having a peak molecular weight ($M_p$) of less than about 100,000 g/mol and a high molecular weight fraction having a peak molecular weight ($M_p$) of greater than about 250,000 g/mol, the low molecular weight fraction present in the composition in an amount less than the high molecular weight fraction.

2. The process according to claim 1, wherein the polymerizing is a solution polymerization process, a slurry polymerization process, a batch process or a continuous process.

3. The process according to claim 1, wherein the first step is conducted for a time in a range of 10-45 minutes.

4. The process according to claim 1, wherein the chain transfer agent is added to the process when 25% or more conversion of monomers to polymer has been achieved, and the chain transfer agent.

5. The process according to claim 1, wherein one or more co-monomers and/or branching agents are added to the process after polymerization has been initiated.

6. The process according to claim 1, wherein the isoolefin is isobutene, and the isobutene is copolymerized with β-pinene or isoprene.

7. The process according to claim 1, further comprising brominating or chlorinating the polyisoolefin-based polymer.

8. A polyisoolefin-based polymer composition produced by the process of claim 1.

9. The composition according to claim 8 having a bimodal molecular weight distribution.

10. The composition according to claim 8, wherein the low molecular weight fraction is present in an amount of 5-50 wt %, based on total weight of polymer.

11. The composition according to claim 8, wherein the polyisoolefin-based polymer composition comprises polyisobutylene.

12. The composition according to claim 8, wherein the polyisoolefin-based polymer composition comprises a copolymer of isobutene and isoprene.

13. The composition according to claim 12, wherein the copolymer is brominated or chlorinated.

14. A cured article comprising a polyisoolefin-based polymer composition, wherein the polyisoolefin-based polymer composition is produced by the process of claim 1.

15. The cured article of claim 14, wherein the cured article is a tire inner liner, a tire inner tube, seals, a gasket or a pharmaceutical closure.

16. The process according to claim 2, wherein the solution polymerization process is a plug flow process.

17. The process according to claim 4, wherein the chain transfer agent comprises 2,4,4-trimethyl-1-pentene.

18. The process of claim 16, wherein the chain transfer agent comprises 2,4,4-trimethyl-1-pentene, and the isoolefin is isobutene, and the isobutene is copolymerized with β-pinene or isoprene.

19. The process of claim 18, further comprising brominating or chlorinating the polyisoolefin-based polymer.

20. The process according to claim 18, wherein
the first step is conducted for a time in a range of 10-45 minutes or the chain transfer agent is added to the process when 25% or more conversion of monomers to polymer has been achieved; and
one or more co-monomers and/or branching agents are added to the process after polymerization has been initiated.

* * * * *